United States Patent [19]

Ziegler

[11] Patent Number: 4,491,057
[45] Date of Patent: Jan. 1, 1985

[54] AXIAL PISTON MACHINE HAVING DOUBLE ACTING PISTONS AND A ROTARY CONTROL VALVE

[75] Inventor: John A. Ziegler, Los Osos, Calif.

[73] Assignee: Anthony D. Morris, Redwood Valley, Calif.

[21] Appl. No.: 404,797

[22] Filed: Aug. 3, 1982

[51] Int. Cl.³ .................... F01B 13/04; F16H 23/00
[52] U.S. Cl. .................................. 91/503; 91/180; 74/60
[58] Field of Search ............. 91/472, 476, 503, 507, 91/180, 482; 417/269, 270; 123/58 BC; 74/60

[56] References Cited

U.S. PATENT DOCUMENTS

| | | | |
|---|---|---|---|
| 571,129 | 11/1896 | Schumacher | 91/180 |
| 1,210,649 | 1/1917 | Holley et al. | 417/269 |
| 2,590,573 | 3/1952 | Rinia | 74/60 |
| 2,881,973 | 4/1959 | Ricardo | 92/165 X |
| 2,984,222 | 5/1961 | Smith | 91/481 |
| 3,398,699 | 8/1968 | Stark | 74/60 |
| 3,429,231 | 2/1969 | Raymond | 91/476 X |
| 3,596,569 | 8/1971 | Wisbey | 91/180 X |
| 4,106,354 | 8/1978 | Girodin | 91/499 X |
| 4,122,757 | 10/1978 | McConnell et al. | 91/503 X |
| 4,304,173 | 12/1981 | Brille | 74/60 |

FOREIGN PATENT DOCUMENTS

| | | | |
|---|---|---|---|
| 446554 | 10/1912 | France | 91/507 |
| 456979 | 1/1913 | France | 417/269 |
| 535630 | 4/1941 | United Kingdom | 74/60 |

*Primary Examiner*—William L. Freeh
*Assistant Examiner*—Paul F. Neils
*Attorney, Agent, or Firm*—Lawrence I. Field; Jacob Shuster

[57] ABSTRACT

An axial piston machine having double acting piston assemblies incorporating swivel joints from which connecting rods extend to drive points on the radial arms of a wobble plate, the central pivot of which is established by a universal joint support. The wobble plate is connected by a crankpin and a crankarm to a crankshaft establishing a precessing driving plane at a tilt angle to the crankshaft axis of preferably less than 18°. A valve rotatable about the crankshaft axis controls the supply and exhaust of fluid to the piston assemblies.

4 Claims, 11 Drawing Figures

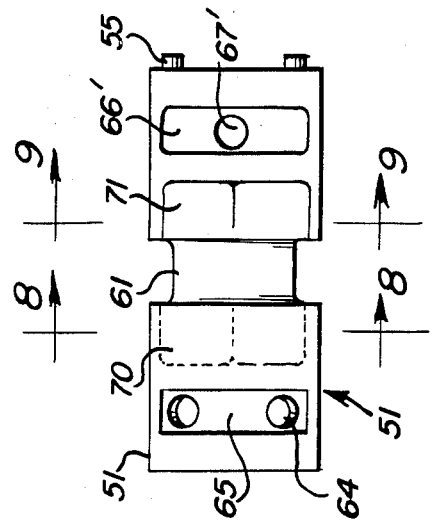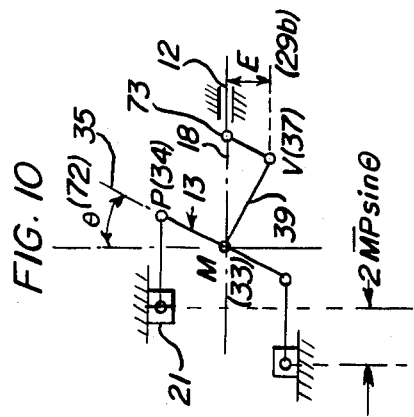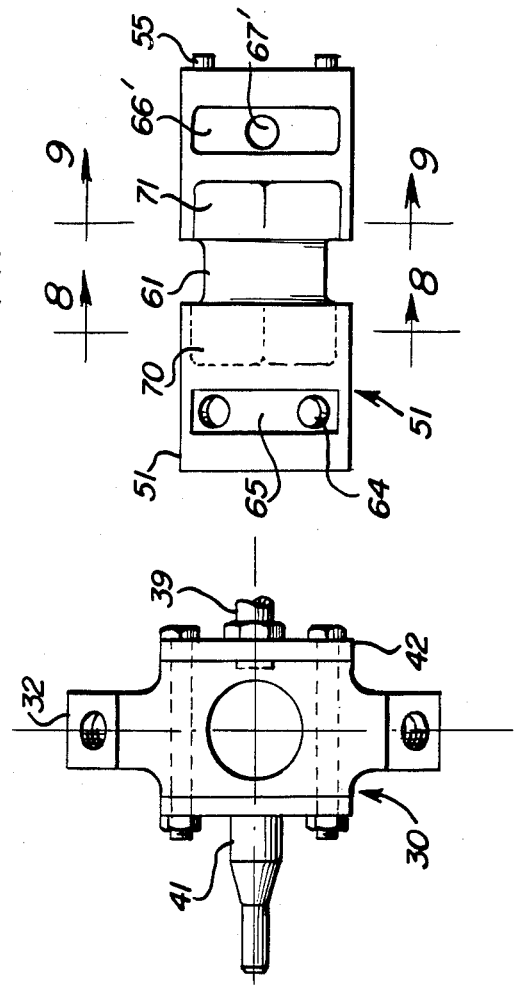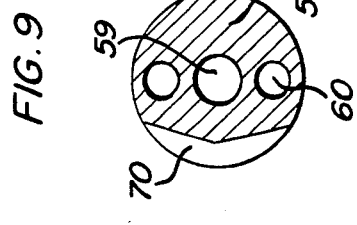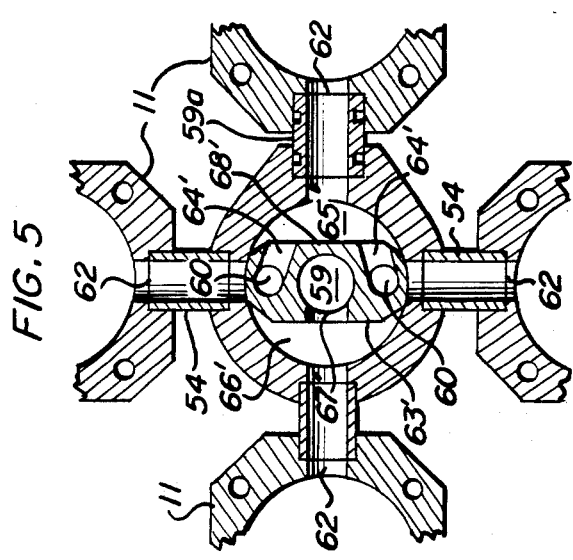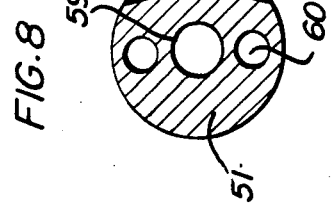

AXIAL PISTON MACHINE HAVING DOUBLE ACTING PISTONS AND A ROTARY CONTROL VALVE

BACKGROUND OF THE INVENTION

This invention relates to axial piston machines including in particular, but not necessarily limited to, axial reciprocating piston steam engines.

In general, an axial piston machine is provided with an array of three or more fixed cylinders having pistons reciprocated along parallel axes clustered about the axis of a single throw crankshaft. Intermediate the cylinder and the crankshaft, a linkage system operatively connects the cylinder pistons to the common crankshaft and includes a wobble plate having a central pivot point established by a universal joint on the crankshaft axis. A valving system is usually provided to port fluid to and from the cylinders to produce uniform rotation of the crankshaft. The foregoing type of axial piston engine is already well known, and while the configuration thereof has obvious advantages, especially for pressurized vapor engines, no such engines have been adopted for use on a wide scale. The lack of commercial exploitation of this type of engine is probably due to bearing failure associated with the relatively complex motion conversion system especially for cylinder assemblies of the double-acting types wherein the piston undergoes a power stroke in both directions of travel.

It is therefore an important object of the present invention to provide an improved axial piston machine of the foregoing type avoiding or minimizing the problems and drawbacks heretofore associated therewith and yet fully utilizing the potential benefits of such machines.

SUMMARY OF THE INVENTION

In accordance with the present invention, three or more axial piston cylinders have piston heads within which ball and socket swivel joints are connected to associated connecting rods. The connecting rods are operatively connected to a wobble plate drive to establish a driving plane in which a polygon is defined by the drive points at which the piston rods are pivotally connected to the wobble plate assembly, the central pivot of which is established in the driving plane at the center of the polygon by the intersection of the perpendicular axes of a universal joint supported by the housing so that the pivot point lies on the main crankshaft axis. The driving plane forms a tilt angle with a plane perpendicular to the crankshaft axis of preferably less than 18°. A crankpin extends from the wobble plate assembly along a crankpin axis perpendicular to and intersecting the driving plane at the pivot center. The crankpin is pivotally connected by means of a crank arm to the crankshaft. As a result of the foregoing arrangement, the axial reciprocating motions of the pistons are converted into uniform rotation of the crankshaft with the piston drive points being displaced along warped arcuate paths having minimal deviation from a straight line.

The foregoing arrangement in accordance with a vapor engine embodiment of the present invention is advantageously associated with a control valve positioned centrally within the array of piston cylinder assemblies. The control valve has a single rotor connected to the wobble plate assembly for drive thereof in synchronized relationship to the movement of the cylinder pistons. Such an arrangement enables easy replacement and reprogramming of the valve rotor. Further, the valve rotor is provided with pressure balancing features to avoid prohibitively high friction forces that would otherwise lock the rotor against rotation. Minor modification of the valve assembly may be effected in accordance with other embodiments of the invention for use of the machine as a pump, a compressor or as a velocity control servo mechanism.

BRIEF DESCRIPTION OF DRAWING FIGURES

The invention will be described hereinafter in greater detail with reference to the accompanying drawings, in which:

FIG. 5 is a partial transverse section view taken substantially through a plane indicated by section line V—V in FIG. 1;

FIG. 6 is a side elevation view of the cage associated with the wobble plate assembly as viewed from a plane indicated by section line VI—VI in FIG. 2;

FIG. 7 is a side elevation view of the valve rotor associated with the engine shown in FIGS. 1, 4 and 5;

FIG. 8 is a transverse section view taken substantially through a plane indicated by section line VIII—VIII in FIG. 7;

FIG. 9 is a transverse section view taken substantially through a plane indicated by section line IX—IX in FIG. 7;

FIG. 10 is a kinematic representation in a single plane illustrating the geometry associated with the engine shown in FIG. 1.

DETAILED DESCRIPTION OF PREFERRED EMBODIMENT

Figure 1:
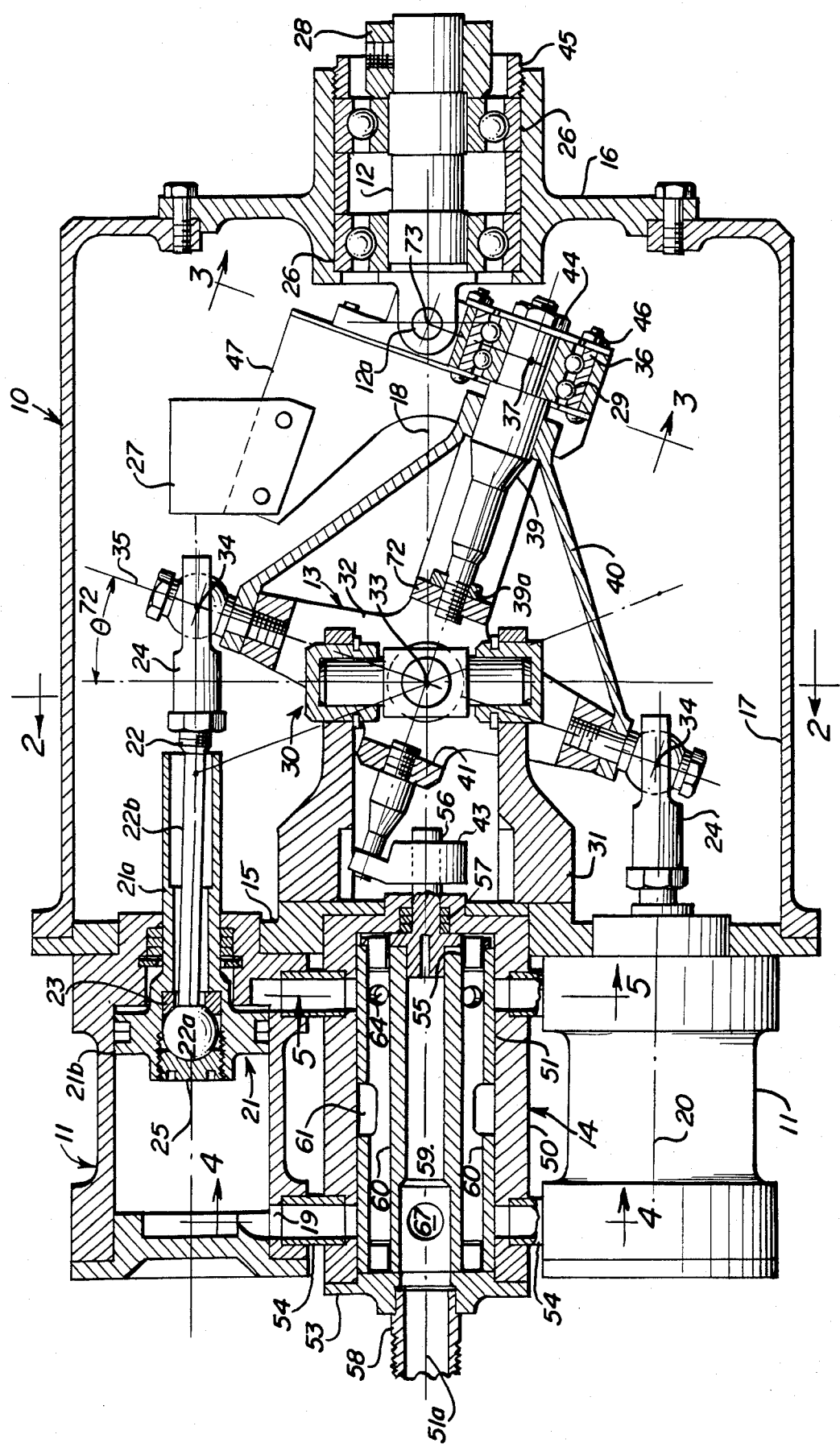
FIG. 1 is a longitudinal section view through an axial piston steam engine, in accordance with one embodiment of the present invention.

Referring now to the drawings in detail, FIG. 1 illustrates as the preferred embodiment an axial-piston steam engine having an engine housing assembly generally referred to by reference numeral 10 supporting in proper operational relationship four basic components of the engine consisting of four identical, fixed cylinder assemblies 11, an output crankshaft 12, a bi-axially bellcrank type of wobble plate 13 operatively interconnecting the cylinder assemblies with the crank shaft, and a steam induction valve assembly 14 to sequentially port steam to and from the cylinder assemblies 11. The housing assembly 10 is formed by end walls 15 and 16 interconnected by a housing section 17 through which a main longitudinal axis 18 of the engine extends.

Each of the fixed cylinder assemblies 11 is of a generally well known, double-acting type, the axes 20 of which are parallel to each other and to the main axis 18. Fluid connections with each cylinder assembly 11 are established through radially extending ports 19 and 62. A piston 21 is displaceable within each cylinder assembly and has a hollow piston rod extension 21a projecting longitudinally along the axis 20 through the end wall 15 on which the cylinder assembly is mounted externally of the engine housing assembly 10. The piston 21 also includes a piston head 21b within the cylinder assembly. A connecting rod 22 extends with radial clearance through the piston rod extension 21a and is formed at one end of its rod shank 22b with a spherical ball element 22a in bearing contact with a spherical bearing socket 23 assembled within the piston head 21b. A socket element 25 is adjustably threaded into the piston head in bearing contact with the spherical ball element 22a at one end of the connecting rod to complete a swivel joint connection thereto. The opposite end of the connecting rod is adjustably secured by a threaded connection to a rod-end fitting 24 thus completing assembly of the cylinder assembly 11. Four cylinder assemblies 11 are separately bolted to the end wall 15 in a quadrate pattern as shown in FIG. 2, with the axes 20 thereof equidistant from the main axis 18.

Figure 3:
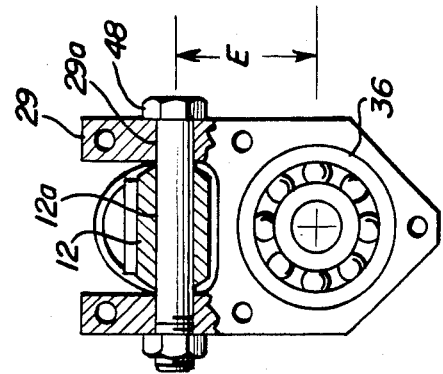
FIG. 3 is a section view taken substantially through a plane indicated by section line III—III in FIG. 1 with parts broken away and shown in section.

The end wall 16 as shown in FIG. 1 has journal extension within which axially spaced and sealed bearings 26 are retained by an assembly ring nut 45 to journal the crankshaft 12 for rotation about axis 18. The crankshaft 12 is axially retained in place by a collar 28 or by the driven load to which the crankshaft is coupled. An extension of the crankshaft within the housing assembly has a transverse bore 12a intersecting axis 18 at point 73 in alignment with holes 29a in bifurcated ends of a crankarm 29. The crankarm 29 is adjustably pinned to the crankshaft 12 by the shank of a bolt and nut 48 extending through the holes 29a and bore 12a as more clearly seen in FIG. 3. A bearing 36 is carried by arm 29 and retained therein by a support bracket 47 and retainer plate 46 secured by fasteners to the crankarm, as shown in FIG. 1. A counterweight 27 is bolted to the support bracket.

Figure 2:
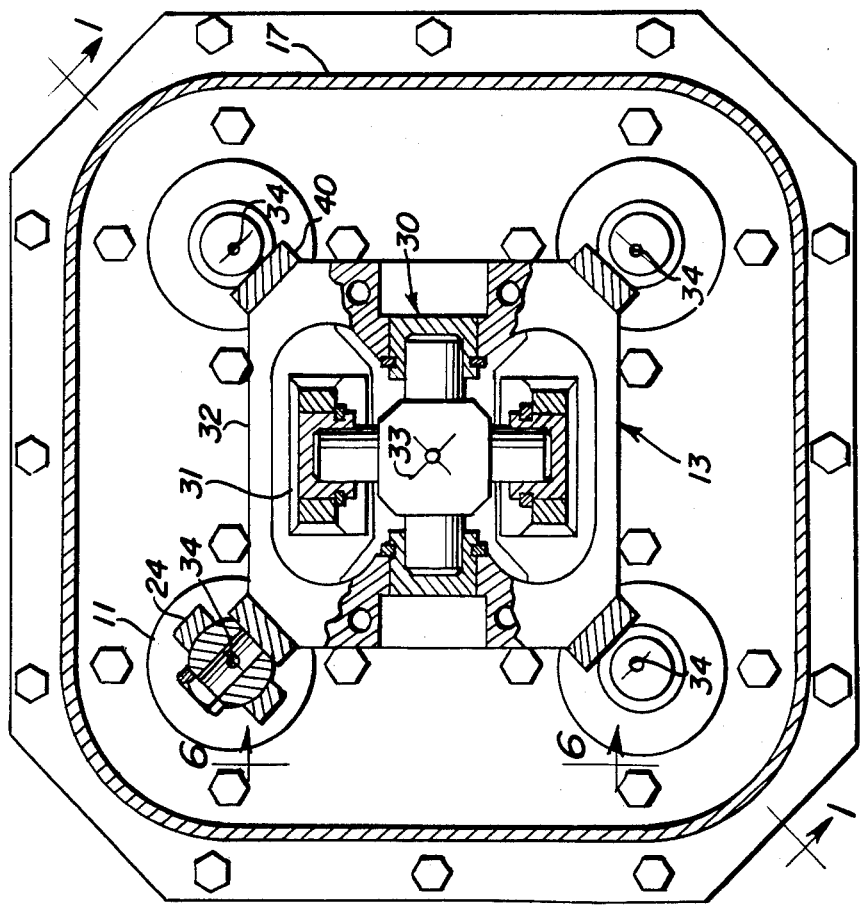
FIG. 2 is a transverse section view taken through a plane indicated by section line II—II in FIG. 1.

Referring now to FIGS. 1 and 2, a universal joint generally referred to by reference numeral 30, couples the bellcrank 13 to the rotor 51 of the valve assembly 14. The joint 30 is of a standard automotive replacement type including four cross trunnions received in roller bearing cups provided with snap rings to hold the cups installed. Two of the axially aligned cups for journals on one axis are installed in a yoke 31 bolted to the end wall 15 of the housing assembly. The two trunnion cups for journals on the second axis are held installed in the bellcrank 13 so that the axes of the trunnions intersect on the main axis 18 at a pivot point 33 axially spaced by a minimal distance from the end wall 15 compatible with the required operational clearances. The bellcrank includes a cage 32 within which two of the trunnion cups for the second axis are retained. A quad link 40 is secured to the four corners of the cage 32 at which the cage is pivotally connected at pivot points 34 to the rod-end fittings 24.

As shown in FIGS. 1 and 6, axially opposite sides of the cage 32 have plates 41 and 42 bolted thereto. The plate 41 has a valve actuating rod extending therefrom connecting the cage to a valve lever arm 43. The plate 42 has a crankpin 39 threadedly connected thereto in axial alignment with the valve actuating rod. Jam nut 39a locks the crankpin 39 in axially adjusted position to the cage plate 42. The crankpin is journalled by bearings 36 in the crankarm 29 to which it is held assembled by nut 44 establishing a reference point 37. The distance E between points 37 and 73 along the crankarm 29 is largely determined by the size of bearing 36 and the magnitude of the radial load to which it is subjected.

Figure 4:
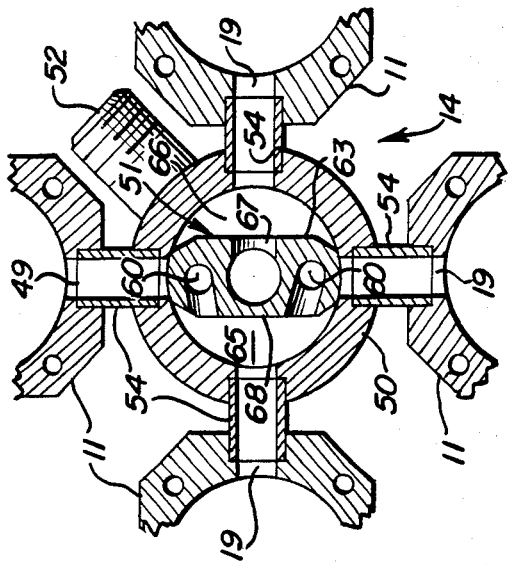
FIG. 4 is a partial transverse section view taken substantially through a plane indicated by section line IV—IV in FIG. 1.

The valve lever arm 43 is connected to the valve rotor 51 by a drive shaft 56 having a flange coupled to one axial end of the rotor by pins 55, as shown in FIG. 1. The rotor 51 is supported for rotation about the main axis 18 in the central bore of a valve body 50 rigidly bolted to the end wall 15 of the housing assembly. A steam supply port 52 is connected to the valve body 50 and extends radially therefrom as shown in FIG. 4. Steam is exhausted from the valve body through an exhaust port 58 connected to one axial end thereof by end cap 53 opposite the drive shaft 56 to which the lever arm 43 is connected. Seals 57 prevent leakage of exhaust steam around shaft 56. The ports 19 and 62 of the cylinder assemblies 11 are connected by connectors 54 to the valve body adjacent the opposite axial ends thereof.

Figure 11:
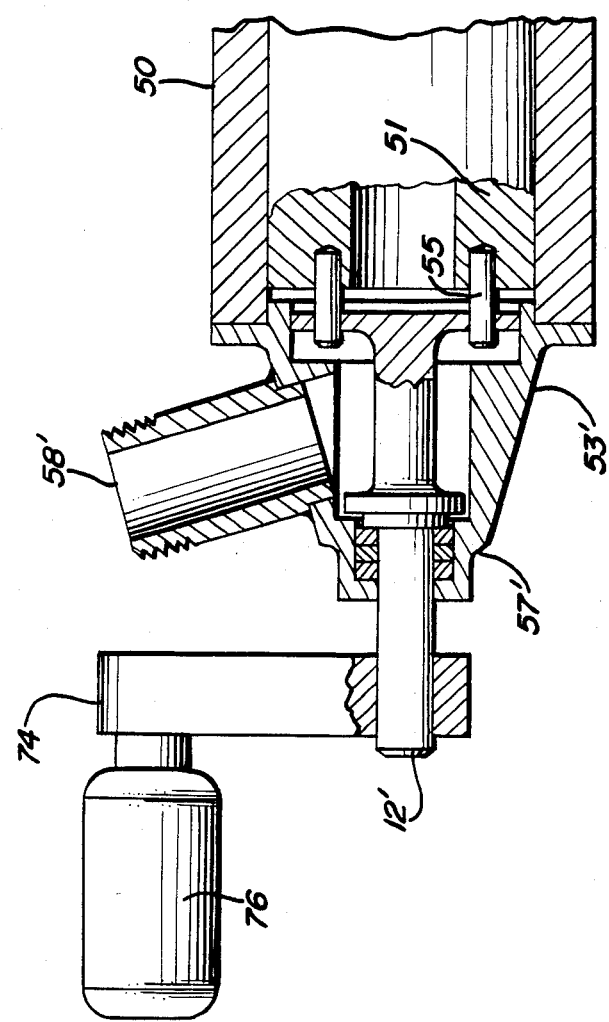
FIG. 11 is a partial section view showing a modification of the arrangement shown in FIG. 1.

FIG. 11 illustrates a modification of the arrangement shown in FIG. 1, whereby a second drive shaft 12' drives the valve rotor 51 independently of the main drive shaft 12 in which case the drive arm 43 is either removed or loosened. The valve rotor may then be driven by hand crank 74 or an electric motor 76 in either direction of rotation to determine the speed and rotational direction of the main shaft 12. The additional shaft 12' is coupled by the pins 55 to the valve rotor and extends therefrom through an end cap 53' within which a shaft seal 57' is located. An exhaust port 58' projects at an angle from the end cap 53' as shown. The axial piston machine when modified in accordance with FIG. 11, would function as a velocity controlled, closed-loop servo mechanism.

The valve rotor 51 is provided with a central longitudinal bore 59 to conduct exhaust flow of fluid to the exhaust port 58. Parallel spaced bores 60 of smaller diameter than central bore 59 are formed in the rotor on opposite sides of the central bore. Centrally between the opposite axial ends of the rotor, an annular groove 61 is formed in alignment with the supply port 52. The axial extent of the annular groove 61 is substantially equal to the diameter of supply port 52 and of a depth reaching the longitudinal axes of the bores 60, as seen in FIG. 1. Thus, pressurized fluid is conducted to the bores 60 from supply port 52 and exhausted through central bore 59 to the exhaust port after being cycled through a cylinder.

As shown in FIGS. 4 and 7, the rotor 51 which is otherwise cylindrical in shape, has arcuate segments removed therefrom adjacent one axial end to form a gate portion having parallel side faces 68 and 63 separating chambers 65 and 66 within the valve body. Pressure chamber 65 is in fluid communication with bores 60 through passages 64 opening through side face 68 while bore 59 is in fluid communication with exhaust chamber 66 through passage 67 opening through side face 63 of the rotor. The pressure and exhaust chambers 65 and 66 will therefore be in fluid communication with diametrically opposite cylinder assemblies 11 through the ports 19 thereof while flow through the ports 19 of the other two cylinder assemblies is blocked, as shown in FIG. 4.

As shown in FIGS. 5 and 7, a second axial end gate portion of rotor 51 is formed by removal of arcuate segments to expose parallel side faces 63' and 68' to valve body chambers 65' and 66'. Passages 64' establish fluid communication between the bores 60 and the pressure chamber 65', while the passage 67' establishes fluid communication between the central bore 59 and the exhaust chamber 66'. The pressure and exhaust chambers 65' and 66' are in fluid communication with the ports 62 of the same two cylinder assemblies 11 in fluid communication with the valve body chambers 65 and 66 through ports 19. However, there is an 180° out of phase relationship between the two gate portions of the rotor so that the same cylinder assembly which is pressurized through port 19 on one axial side of its piston 21 will be exhausted on the other side of its piston 21 through port 62, pressurization occurring through the bores 60 of the valve rotor while exhaust being effected through the bore 59. Pressurization and exhaust of the chambers on opposite sides of the piston will furthermore be reversed each 180° revolution of the valve rotor. Further, each 90° rotation of the valve rotor establishes supply and exhaust communication with a different pair of cylinder assemblies.

FIGS. 7, 8 and 9 illustrate the valve rotor 51 disassembled to show the formation of pressure balancing recesses 70 and 71 that extend axially on opposite sides of the valve rotor from the central annular groove 61 toward but axially spaced from the removed segments exposing side faces 68 and 68', aforementioned. Thus, the hydrostatic pressure applied to the valve rotor within recess 70 will balance the hydrostatic pressure in pressure chamber 65. Toward that end, the pressure surfaces of the rotor in recess 70 is designed to be equal in area to the pressure surfaces in chamber 65 plus an additional area of a magnitude which is dependent on the response to bending of the rotor as empirically determined. Similarly, the pressure surface area of the rotor in recess 71 will be designed to hydrostatically balance that of chamber 65'.

The bellcrank assembly 13 as hereinbefore described establishes a driving plane denoted by reference numeral 35 in FIG. 1 disposed at a tilt angle 72 to a plane perpendicular to the crankshaft axis 18. The driving plane extends through the pivot point 33 of the bellcrank and the drive points 34 at which the bellcrank assembly is pivotally connected to the piston rods of the cylinder assemblies. In accordance with the present invention, the tilt angle 72 preferably does not exceed 18°. The geometry involved in such a linkage drive connection between the crankshaft 12 and the pistons 21 is illustrated in FIG. 10 with respect to a single plane aligned with two of the cylinder assemblies. Based on the geometry of such a configuration, the full stroke of the pistons 21 will be equal to $2\overline{MP} \sin \theta$, where $\overline{MP}$ is the bellcrank radial arm between points 33 and 34 and $\theta$ is the tilt angle 72. The distance (E) between the crankarm pivot point 37 and point 73 on the crankshaft axis 18 is also a function of the tilt angle in accordance with the expression, $E = MV \tan \theta$. Where the tilt angle $\theta$ is 18°, the distance MV or crankpin length between points 33 and 37 is E·cotangent $\theta$ or for 18°, MV = 3.078E. By use of a preferred value of 18° or less, for the driving plane tilt angle, the excursions of the drive points 34 out of the plane of their otherwise arcuate paths do not exceed the amount by which such arcuate paths depart from a straight line. Further, such departure from a straight line both in the plane and perpendicular thereto will be minimal and will not therefore warrant the use of bulky, complicated and costly constant velocity universal joints. Still further, the small deviations of the drive points from a straight path enable the advantageous location of the piston swivel joints within the piston heads, thereby eliminating the need for crosshead connections.

It should also be appreciated that in accordance with the present invention at least three cylinder assemblies are associated with the engine, four being described in connection with the illustrated embodiment. As such, the three or more piston drive points establish the driving plane referred to by reference numeral 35 in FIG. 1 from which the crankpin axis extends perpendicular to such driving plane from point 33 on the crankshaft axis 18 to the crankpin pivot point 37. Thus, the piston drive points 34 and point 37 form a regular pyramid having a polygonal base in the driving plane formed by the drive points 34. The bellcrank assembly 13 as hereinbefore described supports the center 33 of the pyramid base from which the geometrical axis of the pyramid extends constituting the axis for the crankpin 39. A relatively simple and trouble free wobble plate drive connection is thereby established between the pistons 21 and the crankshaft 12 suitable for engines as described and other fluid displacing machines such as pumps or compressors.

What is claimed is:

1. In an axial piston machine having at least three double-acting cylinders, a housing mounting said cylinders in operative relation to a main axis for reciprocation of pistons within the cylinders along axes parallel to the main axis, a crankshaft mounted by the housing for rotation about said main axis, and a linkage mechanism including connecting rods connected to the pistons and means for establishing wobble plate drive points at which the connecting rods are operatively connected to the crankshaft, the improvement comprising extension of the pistons projecting from the cylinders in surrounding relation to the connecting rods, a swivel joint directly mounted within each of the pistons through which the connecting rods pivotally connect to the pistons at the drive points, and a control valve assembly mounted in axially spaced alignment with the crankshaft radially inwardly of the cylinders, said control valve assembly including a valve body fixed to the housing, a valve rotor within the valve body rotatable about the main axis, radially extending ports establishing fluid communication between the valve body and the cylinders on opposite axial sides of the pistons, and valve passage means in the valve rotor for conducting fluid to and from the ports in response to rotation of the rotor, said valve passage means including axially spaced pressure chambers formed in the rotor in axial alignment with the ports, axial conduit means in the rotor for conducting pressurized fluid to and from the chambers, and pressure cavity means in the rotor for balancing internal hydraulic forces resulting from pressurization of the chambers.

2. The machine as defined in claim 1, wherein said drive point establishing means is a bi-axially pivoted bellcrank including a simple universal joint having mutually perpendicular axes intersecting to establish a pivot center, means for supporting the universal joint on the housing with the pivot center disposed on the main axis, radial arm means for connecting the bellcrank to the connecting rods at said drive points and crankpin means operatively connecting the bellcrank to the crankshaft.

3. The machine as defined in claim 1, wherein the valve rotor is drivingly connected to the linkage mechanism for rotation in unison with the crankshaft.

4. The machine as defined in claim 1 including external means for rotating the valve rotor independently of the crankshaft to operate as a velocity control servo mechanism.

* * * * *